United States Patent
Krantz et al.

(10) Patent No.: US 7,160,497 B2
(45) Date of Patent: Jan. 9, 2007

(54) PROCESS AND APPARATUS FOR MOLDING POLYMER FITTINGS

(75) Inventors: Bradley Krantz, Victoria, MN (US); Carlos A. Cadavid, Chanhassen, MN (US); Dale J. Nowak, Silver Lake, MN (US)

(73) Assignee: Entegris, Inc., Chaska, MN (US)

( * ) Notice: Subject to any disclaimer, the term of this patent is extended or adjusted under 35 U.S.C. 154(b) by 224 days.

(21) Appl. No.: 10/706,847

(22) Filed: Nov. 12, 2003

(65) Prior Publication Data

US 2004/0169319 A1    Sep. 2, 2004

Related U.S. Application Data

(60) Provisional application No. 60/425,458, filed on Nov. 12, 2002.

(51) Int. Cl.
*B29C 33/34*  (2006.01)
*B29C 45/00*  (2006.01)

(52) U.S. Cl. .................... 264/328.11; 425/577
(58) Field of Classification Search ............ 264/328.11
See application file for complete search history.

(56) References Cited

U.S. PATENT DOCUMENTS

| | | |
|---|---|---|
| 3,095,613 A | 7/1963 | Johannes |
| 3,545,718 A | 12/1970 | Shale |
| 3,752,436 A * | 8/1973 | Deutsch ............. 249/145 |
| 4,298,330 A | 11/1981 | Davis |
| 4,436,690 A | 3/1984 | Davis |
| 5,433,902 A | 7/1995 | Leyderman |
| 6,328,309 B1 | 12/2001 | Corbett, Jr. |

* cited by examiner

*Primary Examiner*—Christina Johnson
*Assistant Examiner*—Monica A Huson
(74) *Attorney, Agent, or Firm*—Patterson, Thuente, Skaar & Christensen, P.A.

(57) ABSTRACT

A method and apparatus for producing molded fluoropolymer sweep elbows with straight ends while minimizing distortion of the fitting. The invention includes a mold for creating the sweep fittings of the invention. The mold includes a mold cavity block and internal coring. The internal coring includes two symmetrical cores that shut off at a 45° miter. Each of the symmetrical cores is divided into two parts, an outside sweep core and an inside sweep core. The outside sweep core and the inside sweep core are divided on a straight plane running the length of the core. The outside sweep core molds half of the straight lumen and the greater curvature at the outside sweep surface of the bend. The inside sweep core molds the other half of the straight bore and the lesser curvature of the inside or undercut portion of the bend.

10 Claims, 7 Drawing Sheets

PROCESS AND APPARATUS FOR MOLDING POLYMER FITTINGS

RELATED APPLICATIONS

This application claims the benefit of U.S. Provisional Patent Application Ser. No. 60/425,458 entitled "Process and Apparatus for Molding Polymer Fittings", filed Nov. 12, 2002, hereby fully incorporated herein by reference.

FIELD OF THE INVENTION

The invention relates to the field of molding fluid flow components. More particularly, it relates to molding sweep polymer fittings while minimizing distortion of the fitting.

BACKGROUND OF THE INVENTION

In semiconductor manufacturing facilities, commonly known as fabs, highly corrosive, ultra pure liquids are utilized in manufacturing operations. Conventional plastics and metallic tubing and plumbing components are highly unsuitable in these applications. The materials of choice for plumbing components are fluoropolymer plastics such as PFA and PVDF because of their chemical inertness and non-wettability. The plumbing components will typically comprise tubing, valves, fittings, filters, sensors, tanks and the like. Fluids that are handled may include slurries with suspended abrasive materials used for polishing semiconductor wafers. Such polishing must be carefully controlled and uniform over the surface of the wafer. It is desirable for plumbing that handles such slurries to have transitions that are as smooth as possible to minimize the formation of eddy's or quiescent zones in which suspended materials may fall out of suspension. Smooth fluid flow avoids creating the possibility of a non-uniform distribution of abrasive and consequent uneven polishing of wafers. Uneven polishing creates unusable wafers and loss of yield. Thus, smooth transitions are preferred in any fitting which changes the direction of fluid flow to keep suspensions uniform. U.S. Pat. No. 6,399,006 B1 discloses an approach to manufacturing sweep fittings and is incorporated herein in its entirety by this reference.

Conventional standard elbows have a sharp inside corner. The presence of the sharp inside corner can create a substantial pressure loss and consequently, a substantial decrease in flow rate as compared to flow through an equivalent sized straight tube. Further, the sharp corners of a standard elbow create areas of turbulence and eddying. Turbulence and eddy currents can cause particulate matter suspended in slurries to fall out of suspension and accumulate in areas of slow fluid flow. Accumulated particulate matter may build up in these areas and slow the fluid flow through the conduit as well as create the possibility that lumps of particulate matter may break loose from the accumulation and be carried with the flowing fluid. These lumps will destroy the uniformity of a polishing suspension and lead to expensive loss of yield in the wafer production process.

Sharp transitions also create increased friction between flowing fluid and the conduit. Pressure drop within the system lowers flow rates and slows processing. Compensating for pressure drop requires an increased pressure at the head of the system. This produces the need for more powerful pumps and increases stresses on components in the portions of the system where pressures are higher increasing the risk of failure.

Turbulence also creates the possibility that cavitation will occur. Cavitation tends to create increased wear on the surfaces of conduit walls shortening the life of components.

In addition, space is at a premium in modern manufacturing facilities. It is thus preferable that fittings be as small as possible in order to provide for efficient usage of available space. The availability of smaller fittings improves the system layout and efficiency.

Thus, it would be a substantial benefit if fittings were available to provide smooth fluid flow along with minimal turbulence. In addition, it would be a benefit if the fittings were as compact as possible in order to allow a reduced footprint for connection of tubing.

SUMMARY OF THE INVENTION

In a preferred embodiment, an injection molded 90° sweep fitting improves fluid dynamics of fluid transport systems by reducing pressure drop, increasing flow, reducing dead volume, decreasing turbulence and maintaining even flow through the system. In addition, the invention includes a method and apparatus for manufacturing the fitting. The invention reduces shear rate of slurries, reduces dead volume, decreases turbulence and promotes even flow throughout the entirety of fab fluid flow systems.

The sweep fitting of the present invention can include embodiments having threaded ends or non-threaded ends. The sweep fitting includes, in preferred embodiments, on its interior walls, flat drafts. Flat drafts are flattened areas on opposing walls of an otherwise curved elbow type fitting that begin at a starting point inside a first opening of the elbow taper to a maximum width at the bend of the elbow and then taper to a narrower width again to the opposite end of the elbow from it's beginning.

The invention also includes a mold assembly for creating the sweep fittings of the invention. The mold includes a mold cavity block and internal coring. The internal coring includes two symmetrical cores that shut off at a 45° miter. Each of the symmetrical cores is divided into two parts, an outside sweep core and an inside sweep core. The outside sweep core and the inside sweep core are divided on a straight plane running the length of the core and terminating at the miter. The outside sweep core molds half of the straight lumen and the greater curvature at the outside sweep surface of the bend. The inside sweep core molds the other half of the straight lumen and the lesser curvature of the inside or undercut portion of the bend.

The action of removing the cores from the mold block includes three stages. In one embodiment, initially the outside sweep core is retracted in a linear fashion parallel to the length of the core until it is completely clear of the molded part while the inside sweep core remains stationary and engaged in the undercut. Next, the entire core including the inside sweep core translates away from the lesser curvature of the fitting allowing the end of the inside sweep core to clear the undercut, that is the inside surface of the curved sweep. For example, in a direction generally normal to the length of the core. This translation is achieved by shifting the entire core slide assembly from the outside sweep side of the core. Finally, the inside sweep core is refracted until the inside sweep core is completely clear of the fitting component. This can occur with or without further movement of the outside sweep core. This process is repeated for the symmetrical core used to form the other half of the fitting.

Moving away from the sharp corner of a standard elbow design significantly reduces turbulence as fluid rounds the corner of the sweep elbow. This improves fluid dynamics and facilitates even flow through the fitting with minimal turbulence.

A 90° sweep elbow is used as an example for the purpose of this application. This should not be considered as limiting. It should be understood that the process and apparatus as described here may be utilized to manufacture different types of fittings such as sweep elbows, sweep Ys, sweep Ts, sweep Us, traps and other fittings associated with valves, gages, flow meters, and other equipment apparatus used in fab plumbing installations utilizing fluoropolymer materials.

DETAILED DESCRIPTION OF PREFERRED EMBODIMENTS

Referring to FIGS. 1–4, two exemplary embodiments of the invention are depicted. The components 10 in these examples are 90° sweep elbow fittings. They are formed of thermoplastics and in a preferred embodiment of fluoropolymers. The invention may be practiced with a variety of other fittings that have a sweep curve as part of their structure. Those skilled in the art will recognize that the invention may be applied to applications such as sweep elbows, sweep Ys, sweep Ts, sweep Us, traps and other fittings associated with valves, gages, flow meters, and other equipment apparatus used in fab plumbing installations utilizing fluoropolymer materials.

Figure 1:
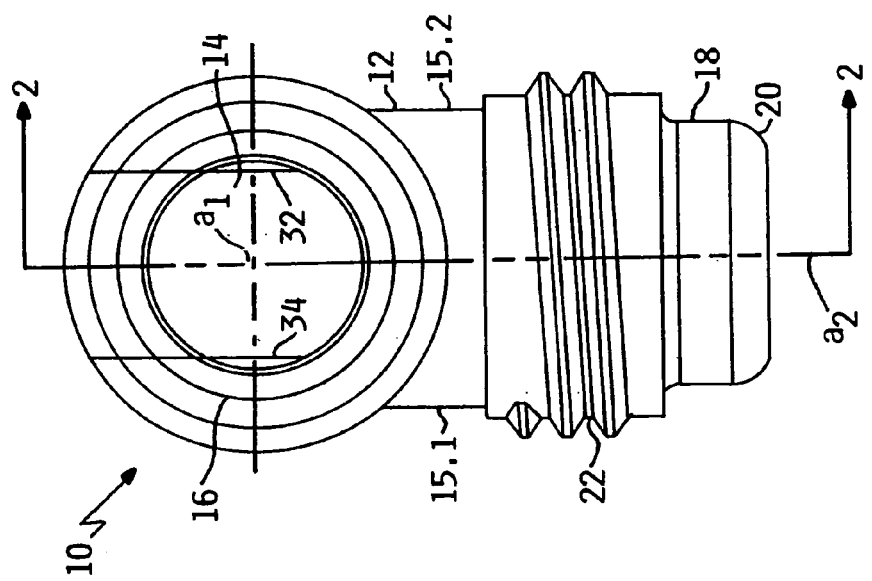
FIG. 1 is an elevational view of an exemplary component in accordance with the present invention.
Figure 2:
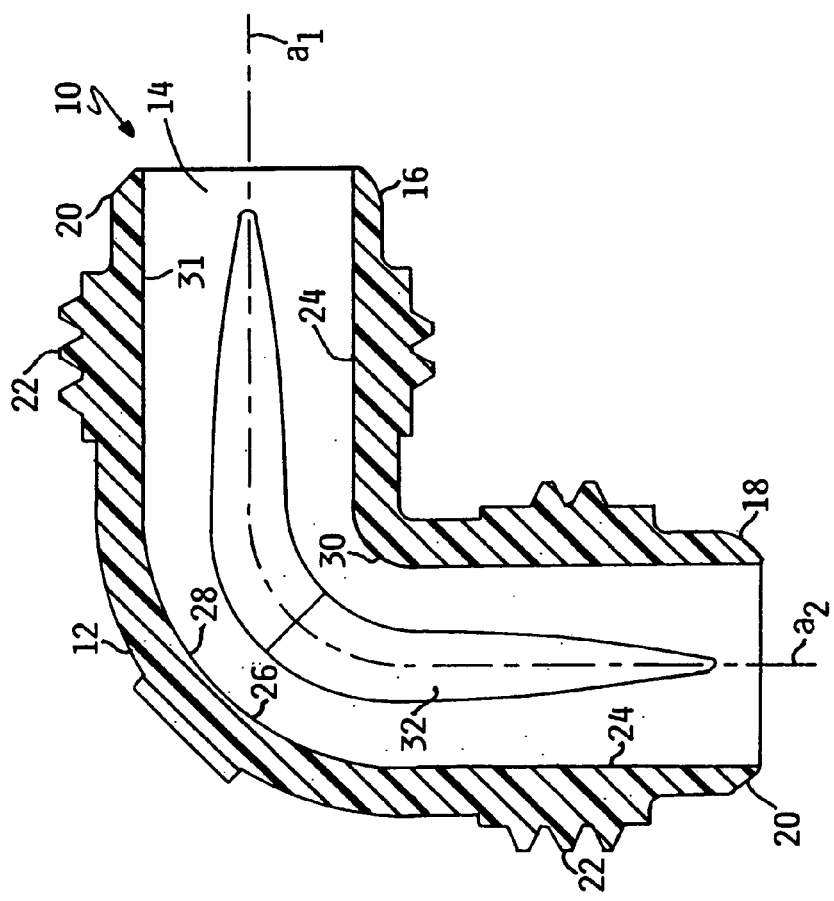
FIG. 2 is a cross-sectional view taken along line 2—2 of FIG. 1.
Figure 3:
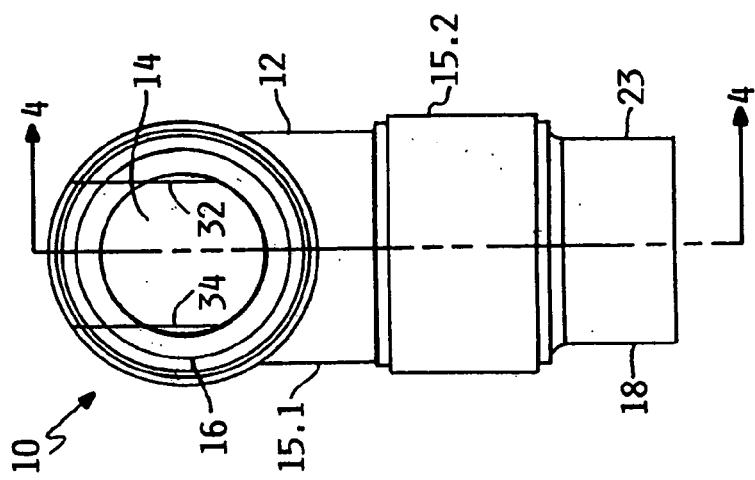
FIG. 3 is an elevational view of a second exemplary embodiment of a component.
Figure 4:
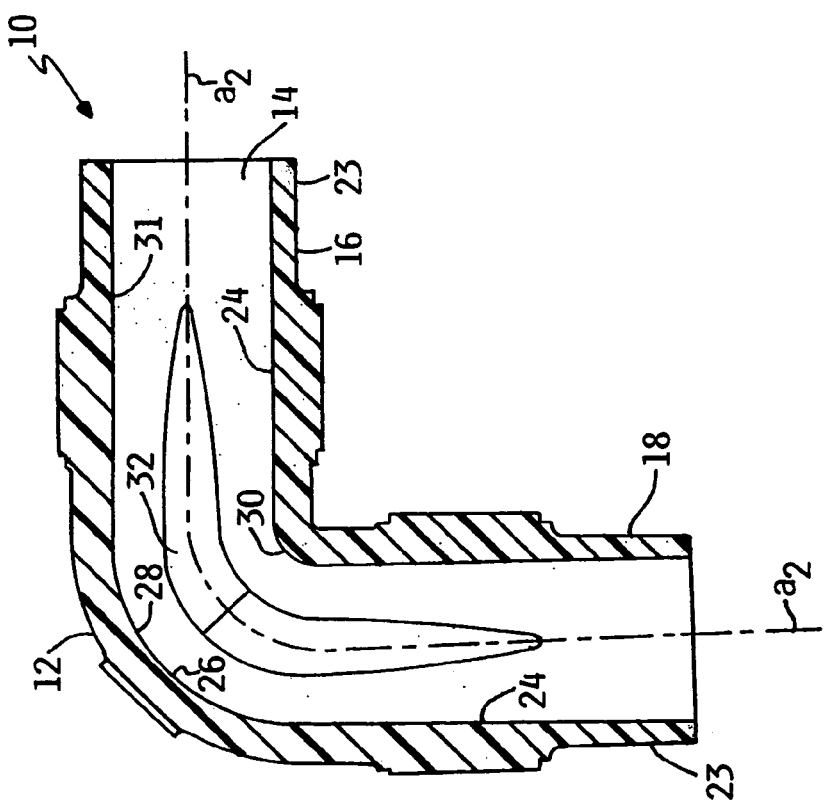
FIG. 4 is a cross-sectional view taken along section line 4—4 of FIG. 3.

The component 10 has a body 12 enclosing a bore or lumen 14, with two sides 15.1, 15.2, defined and differentiated generally by the plane of the cross-sections in the figures, particularly FIGS. 1 and 3. The component 10, in this embodiment, generally includes a straight first end 16 and a straight second end 18 each with an axis a1 and a2. Each of first end 16 and second end 18 may include a nipple 20. Each of first end 16 and second end 18 may include threads 22. Threads 22 may be of any type needed for the application at hand. Component 10 includes straight portions 22 and bend 26. The first and second end may include a fusible end 23 pursuant to the FUSEBOND® process of Entegris, Inc, the assignee of this application. One end may have a different connection means that the other end. Bend 26 includes a greater curvature 28 and a lesser curvature 30 defined by the inside surface 31 of the component and also generally reflected in the outside surface 33. A "sweep fitting" as defined herein means that the curvature of radius of the greater curvature is greater than the diameter of the bore at the ends of the component.

In the vicinity of the transition between greater curvature 28 and lesser curvature 30 component 10, at the sides 15.1, 15.2 of the component, includes first flat draft 32 and second flat draft 34. First flat draft 32 and second flat draft 34 are at their maximum width at the center of bend 26. First and second flat drafts, 32 and 34 taper to a narrow end as they approach first end 16 and second end 18 respectively. First flat draft 32 and second flat draft 34 follow the sweep of the fitting and are generally mirror images of one another. First and second flat drafts, 32 and 34 are substantially planar and are intermediate between greater curvature 28 and lesser curvature 30.

Figure 6:
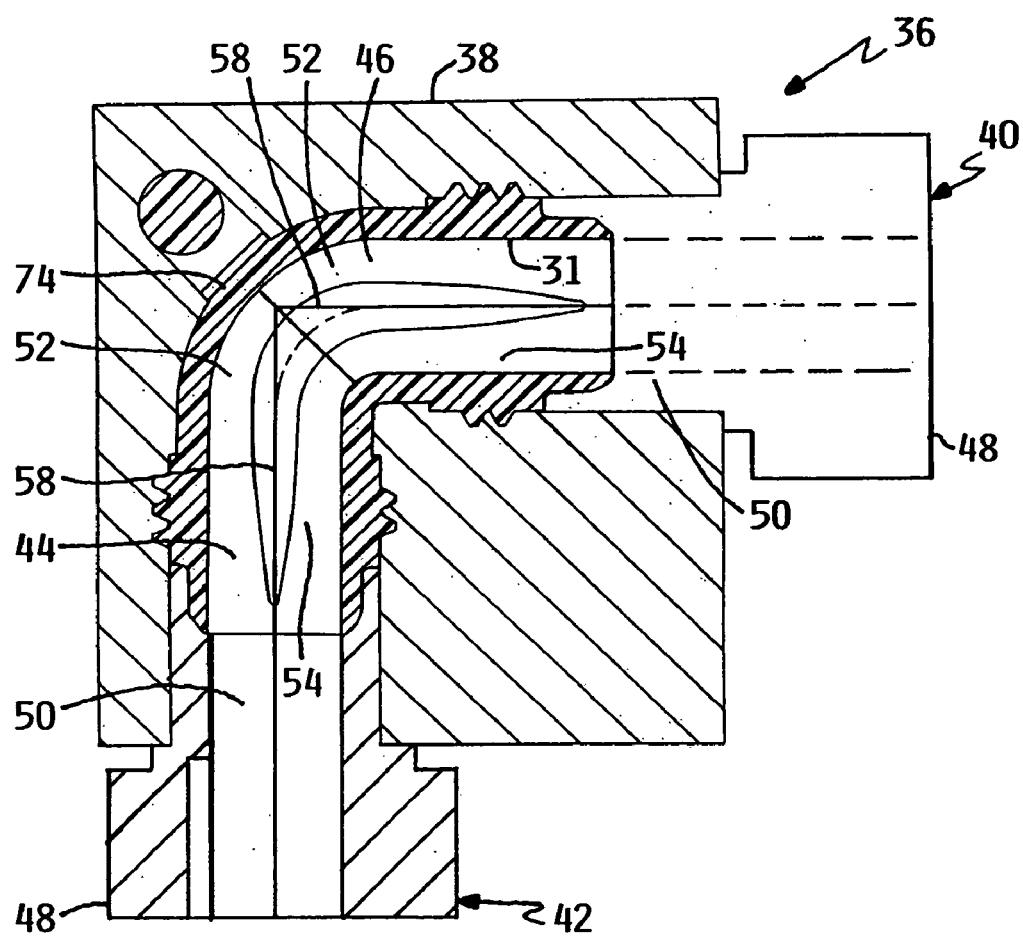
FIG. 6 is a sectional view of a mold block and mold cores with the mold cores fully inserted in accordance with the present invention.

Referring to FIG. 6, mold assembly 36 generally includes mold cavity block 38, first slide assembly 40, second slide assembly 42, first mold core 44 and second mold core 46. In this embodiment, first slide assembly 40 and second slide assembly 42 are mirror images of one another. First mold core 44 and second mold core 46 are mirror images of one another as well. Depending on the application, the invention is not to be considered to be limited to mold assemblies 36 that include mirror image components. First mold core 44 and second mold core 46 can be asymmetrical relative to one another.

Figure 5:
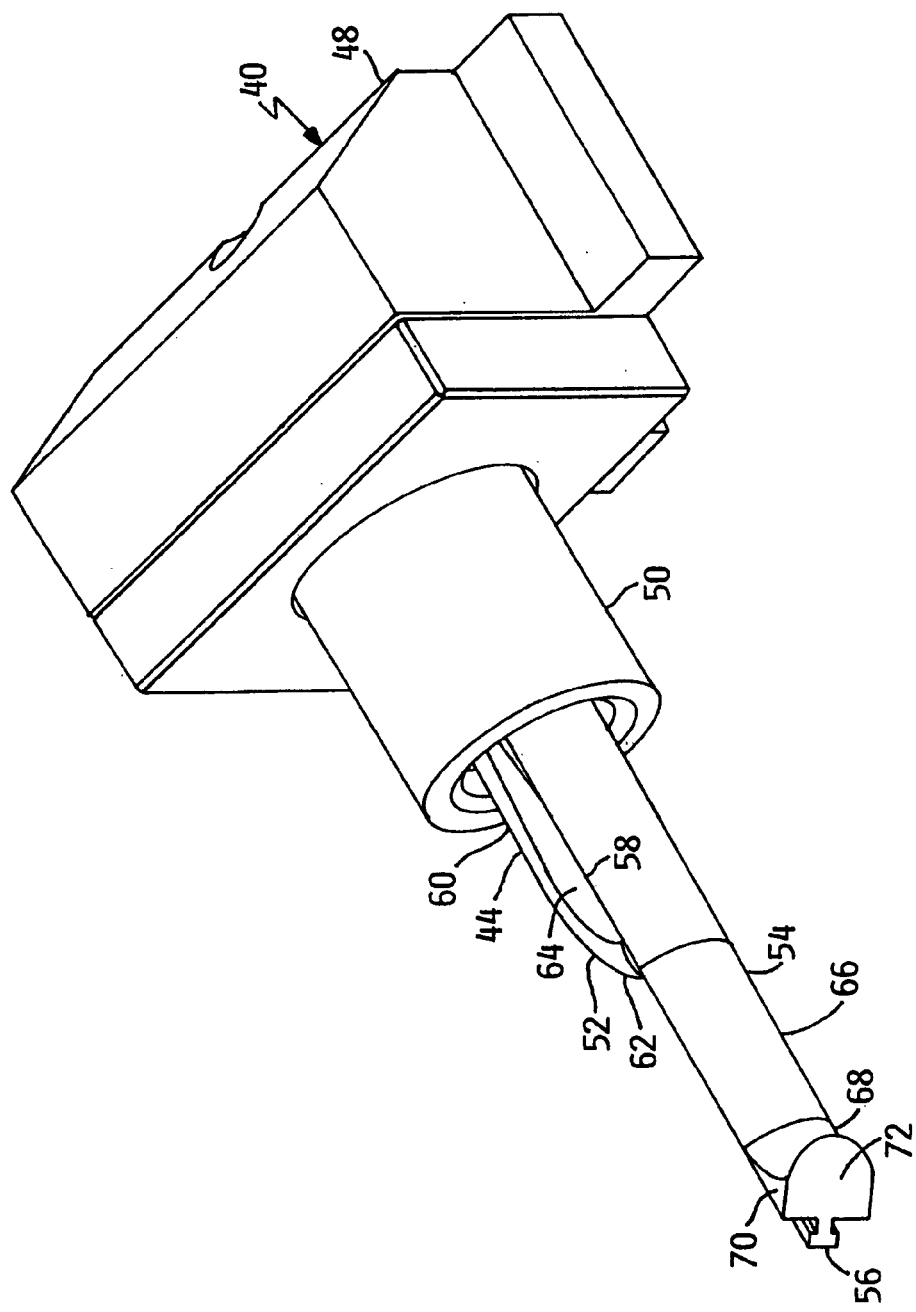
FIG. 5 is a perspective view of one symmetrical mold core with the outside sweep core retracted in accordance with the present invention.

Referring to FIG. 5, first slide assembly 40 includes mounting block portion 48 and insert portion 50. Insert portion 50 supports first mold core 44 and is adapted to fit within mold cavity block 38. Insert portion 50 is preferably approximately circular in cross section. First mold core 44 generally includes outside sweep core 52 and inside sweep core 54. Outside sweep core 52 and inside sweep core 54 are slidably engaged within insert portion 50 so that they can be extended into and retracted from within insert portion 50. Outside sweep core 52 and inside sweep core 54 are also slidably engaged with one another. Alignment guide 56 runs the length of the juncture 58 between outside sweep core 52 and inside sweep core 54. The alignment guide 56 creates an interlocking relationship between outside sweep core 52 and inside sweep core 54 so that they are linearly slidable relative to each other and maintain precise alignment during the sliding process. Outside sweep core 52 includes straight portion 60, bend portion 62 and draft portion 64. Draft portion 64 is mirror imaged on both sides of outside sweep core 52. Inside sweep core 54 includes straight portion 66, undercut portion 68 and draft portion 70. Draft portion 70 is mirror imaged on both sides of inside sweep core 54. When outside sweep core 52 and inside sweep core 54 are fully extended, their respective ends align so as to form miter 72. In this embodiment, second mold core 46 and second slide assembly 42 are similar in structure to first mold core 46 and first slide assembly 40 other than being mirror images thereof.

FIGS. 6–9 sequentially depict some of the steps of molding a component 10 of the present invention. With the mold cavity block 38 closed and with first mold core 44 and second mold core 46 fully extended and engaged with one another molten fluoropolymer is injected into the cavity 74 of mold cavity block 38 and allowed to set at least partially.

FIG. 6 shows the at least partially set component 10 in mold cavity block 38 with first mold core 44 and second mold core 46 fully extended and engaged with one another. An operating mechanism, not shown, controls the retraction, insertion and other motion of the first mold core 44, second mold core 46, first slide assembly 40 and second slide assembly 42. Operating mechanism (not shown) is preferably automated. When fully extended, first mold core 44 and second mold core 46 meet at miter 72. Miter 72 is located at the center of bend 26.

Figure 7:
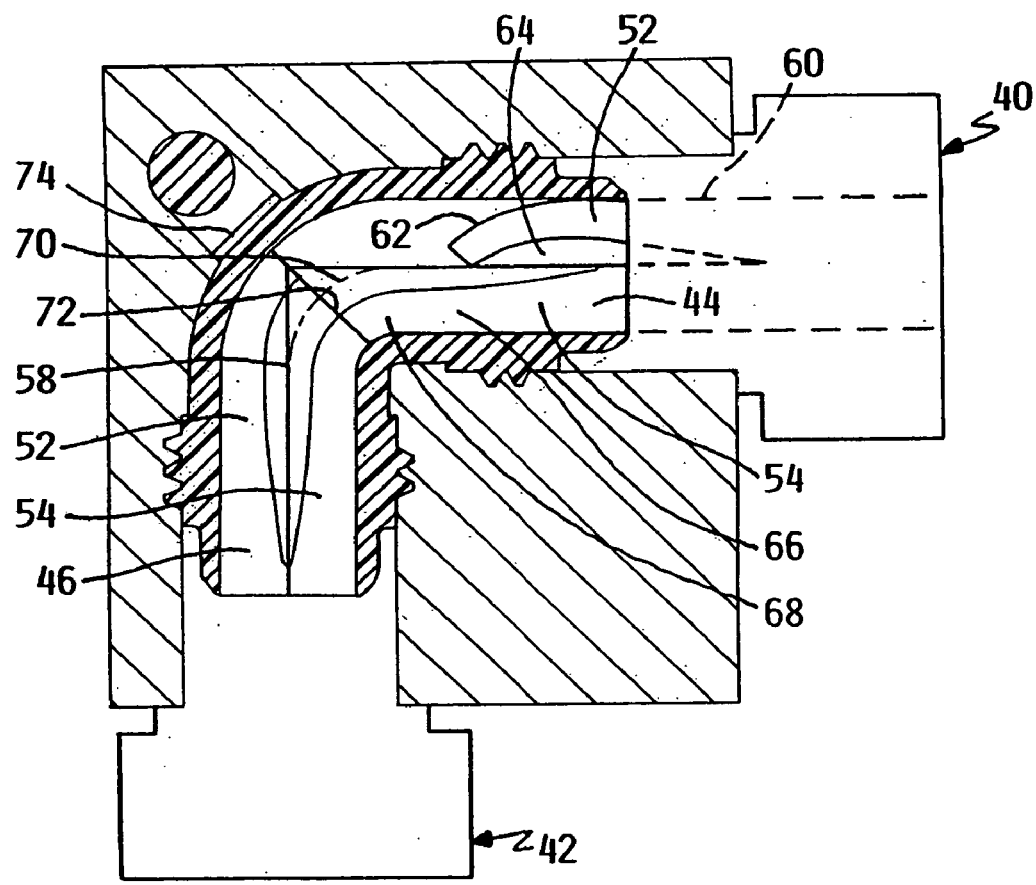
FIG. 7 is a sectional view of the mold core with one of the outer sweep cores partially retracted.

Referring to FIG. 7, first mold core 44 is depicted with outside sweep core 52 partially retracted. As outside sweep core 52 retracts linearly, it retains alignment with inside sweep core 54. Outside sweep core 52 retracts until it is completely clear of lumen 14. After inside sweep core 54 is fully retracted, first slide assembly 40 is linearly retracted until insert portion 50 is clear of mold cavity block 38. Inside sweep core 54 remains in place for the time being.

Figure 8:
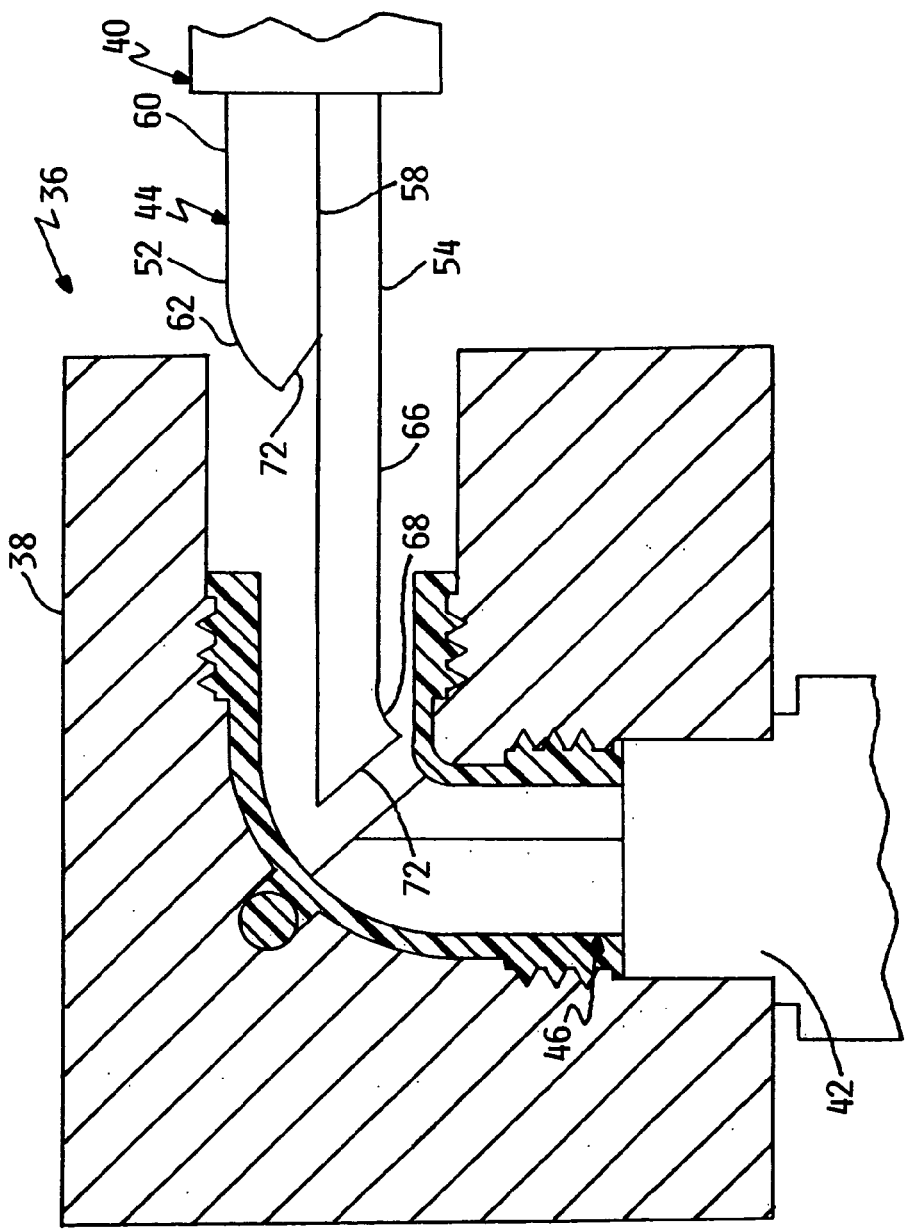
FIG. 8 is a sectional view of the mold core with the outer sweep core completely retracted and the inner sweep core translated away from an undercut.

Referring to FIG. 8, after outside sweep core 52 and insert portion 50 are clear of mold cavity block 38, first slide assembly 40 is translated in it's entirety, for example, generally normal to the direction of the first refraction, (including outside sweep core 52, inside sweep core 54 and insert portion 50) until undercut portion 68 of inside sweep core 54 is clear of lesser curvature 30. At this point, first slide assembly 40 is refracted linearly to withdraw inside sweep core 54 from the inside of lumen 14.

Second slide assembly 42 and second mold core 46 are retracted from the opposite end of component 10 in a like fashion. It should be noted that first flat draft 32 and second flat draft 34 accommodate the translational motion involved in retracting first mold core 44 and second mold core 46 from within component 10.

Figure 9:
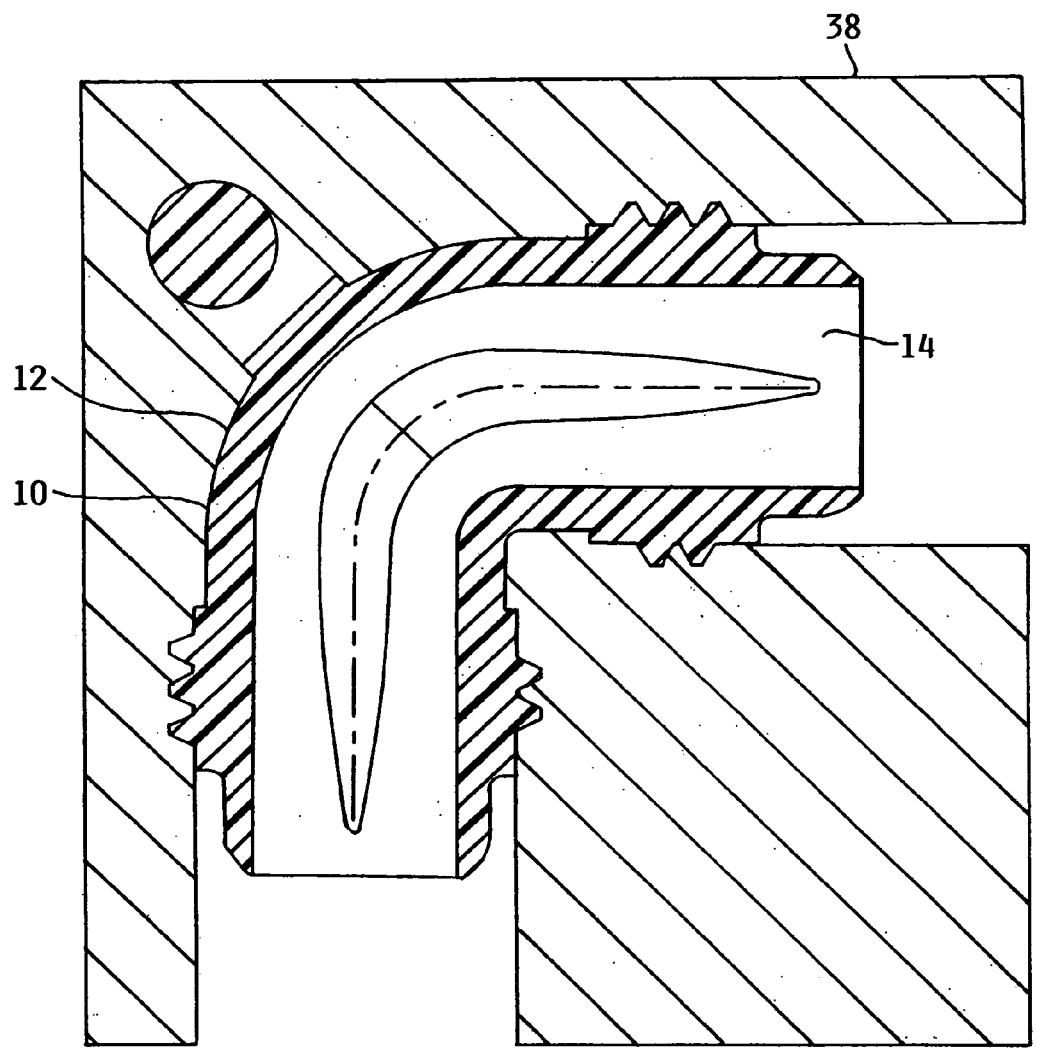
FIG. 9 is a sectional view of a component in accordance with the present invention inside the mold block with the mold cores entirely retracted.

Referring to FIG. 9, component 10 is depicted with first mold core 44 and second mold core 46 completely retracted. At this point, mold cavity block 38 may be opened and component 10 removed. Then the process may be repeated to mold further components 1.

Computational Fluid Dynamics software demonstrates a fifty six percent increase in fluid flow and a sixty percent decrease in pressure drop through the same sized fitting at a fluid flow rate of five gallons per minute.

The present invention may be embodied in other specific forms without departing from the central attributes thereof, therefore, the illustrated embodiments should be considered in all respects as illustrative and not restrictive, reference being made to the appended claims rather than the foregoing description to indicate the scope of the invention.

What is claimed is:

1. A method of forming a sweep elbow fitting having a bend portion and two straight portions, a greater curvature and a lesser curvature, the method comprising the steps of:
    inserting a first segmented mold core, having a plurality of segments, including a first segment and a second segment, the mold core having a bend portion and a straight portion, into a mold cavity, the first segment being positioned along the greater curvature and the second segment being positioned along the lesser curvature and the first segment being slidably movable relative to the second segment;
    inserting a second similar segmented mold core, having a plurality of segments, including a third segment and a fourth segment, the mold core having a bend portion and a straight portion, into the mold cavity, the third segment being positioned along the greater curvature and the fourth segment being positioned along the lesser curvature and the third segment being slidably movable relative to the fourth segment;
    injecting a molten polymer into the mold cavity;
    allowing the molten polymer to, at least partially, set;
    linearly retracting the first segment of the mold core from the mold cavity in a first direction substantially parallel to the straight portion;
    translating the first mold core in a direction generally normal to the first direction of linear retraction;
    linearly retracting the second segment;
    linearly retracting the third segment of the mold core from the mold cavity in a second direction;
    translating the second mold core in a direction generally normal to the second direction of linear retraction; and
    linearly retracting the second segment.

2. The method of claim 1 further comprising the step of selecting the segmented mold core and the similar mold core such that each have only two segments.

3. The method of claim 1, further comprising the step of selecting segments such that the first and second segments share opposed surfaces and the third and fourth segments share opposed surfaces and further comprise alignment guides on the opposed surfaces.

4. The method of claim 1, further comprising the step of injecting perfluoroalkoxy as the molten polymer.

5. A method of forming a curved fluid passageway in a plumbing fitting, the method comprising the steps of:
    inserting a segmented mold core, having a first segment and a second segment, the mold core having a bend portion and a straight portion, into a mold cavity, the first segment and the second segment each comprising about half of a cylinder and the first segment further comprising a greater curvature of a bend and the second segment further comprising a lesser curvature of the bend and the first segment and the second segment sharing an axially extending interface;
    injecting a fluid polymer into the mold cavity;
    allowing the fluid polymer to at least partially set;
    linearly retracting the first segment of the mold core from the mold cavity;
    translating the mold core in a direction generally normal to the direction of the linear refraction; and
    linearly retracting the second segment from the mold core.

6. The method of claim 5, further comprising the step of injecting perfluoroalkoxy as the fluid polymer.

7. A mold core for forming a curved fluid passage in a fluid flow fitting, the mold core comprising;
    two segments, each segment having a bend portion and a straight portion and the two segments forming together a miter at an end thereof,
    the two segments being linearly retractable independently of each other and the mold core being movable translationally in a direction substantially normal to a direction of the linear retraction, and the mold core being capable of insertion into and retraction from a mold cavity.

8. The mold core of claim 7, comprising a first segment and a second segment, the first segment comprising an outside sweep core and the second segment comprising an inside sweep core.

9. The mold core of claim 7, each segment thereof having at least one face in slidable opposition to at least one face of at least one other segment, the faces having alignment guides to maintain relative alignment thereof.

10. The mold core of claim 9, in which the alignment guides comprise a boss on a first face and an interlocking groove on a second face.

* * * * *

UNITED STATES PATENT AND TRADEMARK OFFICE
CERTIFICATE OF CORRECTION

PATENT NO. : 7,160,497 B2  
APPLICATION NO. : 10/706847  
DATED : January 9, 2007  
INVENTOR(S) : Bradley Krantz, Carlos A. Cadavid and Dale J. Nowak It is certified that error appears in the above-identified patent and that said Letters Patent is hereby corrected as shown below:

Column 2, Line 61, please replace "refracted" with --retracted--  
Column 3, Line 66, please replace "that" with --than--  
Column 5, Line 16, please replace "it's" with --its--  
Column 5, Line 17, please replace "refraction" with --retraction--  
Column 5, Line 21, please replace "refracted" with --retracted--

Signed and Sealed this

First Day of July, 2008

JON W. DUDAS  
*Director of the United States Patent and Trademark Office*